United States Patent
Rand et al.

(10) Patent No.: US 9,045,575 B2
(45) Date of Patent: Jun. 2, 2015

(54) POLYMETHACRYLIC ACID ANHYDRIDE TELOMERS

(71) Applicant: Rohm and Haas Company, Philadelphia, PA (US)

(72) Inventors: Charles J. Rand, Philadelphia, PA (US); Barry Weinstein, Dresher, PA (US); C. Damien Rodowski, Downingtown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/356,969

(22) PCT Filed: Nov. 6, 2012

(86) PCT No.: PCT/US2012/063674
§ 371 (c)(1),
(2) Date: May 8, 2014

(87) PCT Pub. No.: WO2013/070581
PCT Pub. Date: May 16, 2013

(65) Prior Publication Data
US 2014/0323743 A1    Oct. 30, 2014

Related U.S. Application Data

(60) Provisional application No. 61/558,771, filed on Nov. 11, 2011.

(51) Int. Cl.
*C08F 220/08*    (2006.01)
*C08F 2/38*    (2006.01)

(52) U.S. Cl.
CPC ............... *C08F 220/08* (2013.01); *C08F 2/38* (2013.01)

(58) Field of Classification Search
CPC .................................................. C08F 220/08
USPC ....................................................... 549/221
See application file for complete search history.

(56) References Cited

U.S. PATENT DOCUMENTS

| | | |
|---|---|---|
| 3,137,660 A | 6/1964 | Jones |
| 4,138,541 A | 2/1979 | Cenci et al. |
| 4,742,123 A | 5/1988 | Kopchik |
| 5,130,369 A | 7/1992 | Hughes et al. |
| 5,216,099 A | 6/1993 | Hughes et al. |
| 5,256,746 A | 10/1993 | Blankenship et al. |
| 5,294,686 A | 3/1994 | Fiarman et al. |
| 5,539,071 A | 7/1996 | Steffler |
| 5,614,017 A | 3/1997 | Shawl |
| 6,071,434 A | 6/2000 | Davis et al. |
| 6,384,111 B1 | 5/2002 | Kistenmacher et al. |
| 6,673,885 B1 | 1/2004 | Shibata et al. |
| 7,906,591 B2 | 3/2011 | Weinstein et al. |
| 8,008,374 B2 | 8/2011 | Sulser et al. |
| 8,022,120 B2 | 9/2011 | Becker et al. |
| 2004/0024130 A1 | 2/2004 | Nelson et al. |
| 2006/0004148 A1 | 1/2006 | Sulser et al. |
| 2008/0153946 A1 | 6/2008 | Kelly |
| 2009/0137746 A1 | 5/2009 | Weinstein et al. |
| 2009/0182061 A1 | 7/2009 | Moro et al. |
| 2010/0069532 A1 | 3/2010 | Uribe Arocha et al. |
| 2010/0273923 A1 | 10/2010 | Suau et al. |
| 2011/0021698 A1 | 1/2011 | Vyorykka et al. |
| 2013/0122299 A1 | 5/2013 | Rand et al. |

FOREIGN PATENT DOCUMENTS

| | | |
|---|---|---|
| EP | 0516346 A1 | 12/1992 |
| EP | 1942142 A1 | 7/2008 |
| EP | 2033992 A2 | 3/2009 |
| EP | 2072531 A1 | 6/2009 |
| GB | 1595688 A | 8/1981 |
| JP | 04255709 B2 | 4/2009 |
| WO | 2007051858 A2 | 5/2007 |
| WO | 2008068213 A1 | 6/2008 |

OTHER PUBLICATIONS

Bang-Chein Ho et al., "Thermal Degradation of Polymethacrylic Acid," Journal of Polymer Science, Part A: Polymer Chemistry, vol. 30, 1992, pp. 2389-2397.
D. H. Grant et al., "The Thermal Decomposition of Polymethacrylic Acid," Polymer, No. 1, 1960, pp. 125-134.
I. C. McNeill et al., "Thermal Stability and Degradation Mechanisms of Poly(Acrylic Acid) and its Salts: Part 1—Poly (Acrylic Acid)," Polymer Degradation and Stability, vol. 29, 1990, pp. 233-246.
A. A. Litmanovich et al., "Peculiarities of Cyclic Anhydride Links Formation in Macromolecules of Polymethacrylic Acid Bound in Complexes with Poly Ethylene Glycols of Various Molecular Masses," JHMS (Journal of High Molecular Compositions), No. 9, 1975, pp. 681-684.
C. A. Fyfe et al., "Investigation of the Thermal Degradation of Poly(acrylic acid) and Poly(methacrylic acid) by High-Resolution 13C CP/MAS NMR Spectroscopy," Macromolecules, vol. 19, 1986, pp. 1909-1912.

*Primary Examiner* — Taofiq A Solola
(74) *Attorney, Agent, or Firm* — Andrew E. C. Merriam

(57) ABSTRACT

The present invention provides hypophosphite (co)telomers of methacrylic anhydride having a weight average molecular weight of from 1,000 to 20,000, and having, on average, at least one phosphorus atom bound to two carbon atoms, and at least one carboxylic acid or salt group.

10 Claims, No Drawings

POLYMETHACRYLIC ACID ANHYDRIDE TELOMERS

The present invention relates to hypophosphite telomers of methacrylic anhydride. More particularly, it relates to phosphate and hypophosphite containing telomers and cotelomers of methacrylic anhydride and methods for making them.

In contrast to poly(acrylic acid) (pAA), poly(methacrylic acid), (pMAA) forms cyclic anhydrides at a much higher temperature (>200° C.) and the anhydride does not decarboxylate to a large extent until temperatures reach in excess of 250° C. and are maintained for an extended duration. Owing in part to the marked difference in thermal stability of pMAA and pAA, the two polyacid polymers find different commercial uses as dispersants. P-MAAs are used as dispersants in high pressure-temperature boilers and pAAs are valued as dispersants for cooling water and detergent applications (*Handbook of Industrial Water Conditioning*, p. 90-91, 8th. Edition, 1980 Betz Laboratories, Inc., Trevose, Pa.). The known thermal studies that compared these seemingly similar polyacid polymers were conducted on high molecular weight addition polymers having molecular weight in excess of 100,000 and closer to 250,000 daltons such that in their preparative methods molecular weight was not regulated, as with the use of chain transfer agents.

Certain useful poly(methacrylic acid) (pMAA) polymers and copolymers have been used as water reducing superplasticizers for cement admixtures. Such (pMAA) polymers and copolymers generally have molecular weights well below 100,000 daltons and are known to comprise alkyl capped poly(ethylene glycol) ester side-chains on the (pMAA) polymers and copolymers. Conventionally, such superplasticizers are manufactured via copolymerization of methoxypolyethyleneglycol methacrylate with methacrylic acid (MAA) or by methyl capped polyglycol esterification of pMAA after the (pMAA) polymers and copolymers are made. The known (pMAA) polymers and copolymers are prepared with either sulfur containing chain transfer polymerization or high concentrations of initiator (>>>0.01%) to give polymers having a molecular weight of less than 15,000 daltons. However, such polymers are not thermally stable which greatly limits their processing flexibility and limits the ease with which one can make superplasticizers from them.

U.S. patent publication no. 2010/0273923A, to Suau et al. of Coatex S.A.S., discloses grafting polyoxyalkylated lateral groups onto (meth)acrylic carboxyl group containing polymers in the dry state and in the presence of an antioxidant. The process is said to enable rapid, low cost processing with a high output and in the absence of solvent. The (meth)acrylic polymers are spray dried in a dryer by atomization. The methods for making the (pMAA) polymers and copolymers in Suau et al. are not particularly limited (see [0030]) and would be expected to provide polymers that suffer from thermal stability problems. In addition, the need to use costly antioxidants makes the Suau process less desirable in practice than is proposed.

The present inventors have sought to solve the problem of providing a thermally stable polymer that is useful in a thermosetting binder and that can be readily modified to make comb polymers, such as those used as superplasticizers, rheology modifiers and colloidal stabilizers.

STATEMENT OF THE INVENTION

The present invention provides polymer compositions comprise hypophosphite (co)telomers of methacrylic anhydride having a weight average molecular weight (Mw) of from 1,000 to 20,000, or, preferably, 2,000 or more, or, preferably, 15,000 or less, or, more preferably, 10,000 or less.

In accordance with the present invention, the hypophosphite (co)telomers of methacrylic anhydride comprise carboxylic acid or salt groups. Such (co)telomers comprise an average of i) from 30 to 80%, preferably less than 50% or, preferably, 35% or more of polymerized units bearing carboxylic acid or salt groups, based on the total weight of acidic polymerized units and ii) from 20 to 70% of anhydride groups, based on the total weight of acidic polymerized units, all percentages as determined by Fourier transform infrared (FTIR) spectroscopy.

Preferably, the hypophosphite (co)telomers of the present invention has on average at least one phosphorus atom in the polymer that is bound to a carbon atom of the polymer backbone, as determined by 31-P NMR, as a terminal or pendant group. The at least one phosphorus atom in the polymer backbone can be bound to two carbon atoms, as a phosphite along the carbon chain, such as a dialkyl phosphinate.

In accordance with the present invention, the (co) telomers of methacrylic anhydride comprise from 2 to 20 wt. %, preferably, 4 wt. % or more, or, preferably, 15 wt. % or less of a hypophosphite compound or its salt, such as, for example, sodium hypophosphite, based on the total weight of reactants (i.e. monomers, hypophosphite compound and chain transfer agents) used to make the (co)telomer.

The hypophosphite containing (co) telomers of methacrylic anhydride are chosen from hypophosphite containing homotelomers of methacrylic anhydride, i.e. made from methacrylic acid and hypophosphite compound reactants only, and hypophosphite cotelomers of methacrylic anhydride made with additional monomers.

In accordance with the present invention, the cotelomers of methacrylic anhydride comprise telomers made from 20 wt. % more and up to 98 wt. % of methacrylic acid, preferably, 40 wt. % or more, or, more preferably 60 wt. % or more, and one or more hypophosphite compounds, based on the total weight of monomers and reactants including the hypophosphite that are used to make the cotelomer.

The polymer compositions of the present invention may comprise powders, pellets, or granules of the hypophosphite (co)telomers of methacrylic anhydride or suspensions thereof in non-aqueous carriers, such as oils, e.g. vegetable oils, glycols, polyglycols, ethers, glycol ethers, glycol esters and alcohols.

The present invention comprises methods for making hypophosphite (co)telomers of methacrylic anhydride comprising drying one or more (co)telomer of methacrylic acid at a temperature of 175 to 230° C., preferably, 180° C. or more or, preferably, 220° C. or less. The drying can take place in an extruder, kneader or kneader reactor, fluid bed dryer, evaporator, heated mixer and any of the foregoing following spray drying.

As used herein, the term "acidic polymerized units" refers to carboxylic anhydrides, carboxylic acids and salts thereof. Carboxylic anhydrides of methacrylic acid can form from the acidic functions of neighboring acidic polymerized units along a single (co)telomer chain, from acidic functions of distal acidic polymerized units along a single (co)telomer chain, or from acidic functions of separate (co)telomer chains.

As used herein, the term "based on the total weight of monomers" refers to the total weight of addition monomers, such as, for example, vinyl monomers.

As used herein, the term "Fourier transform infrared (FTIR) spectroscopy" means that which creates a spectrum measured using a ThermoNicolet™ 6700 FTIR (Thermo Fisher Scientific Waltham, Mass.) spectrometer with a variable-temperature Specac Golden Gate™ diamond attenuated total reflectance (ATR) accessory (Specac Inc (USA) Cranston, R.I.), data collection parameters at 4 cm$^{-1}$ resolution, 16 scans Happ-Genzel apodization and no zero-filling. The ATR accessory was preheated to the desired temperature, and then a film of an aqueous solution of a hypophosphite methacrylic acid telomer at about 6000 daltons was cast onto the ATR crystal. Spectra were continuously measured over time.

As used herein, the term "molecular weight" or "Mw" refers to a weight average molecular weight as determined by aqueous gel permeation chromatography (GPC) using an Agilent 1100 HPLC system (Agilent Technologies, Santa Clara, Calif.) equipped with an isocratic pump, vacuum degasser, variable injection size auto-sampler, and column heater. The detector was a Refractive Index Agilent 1100 HPLC G1362A. The software used to chart weight average molecular weight was an Agilent ChemStation, version B.04.02 with Agilent GPC-add on version B.01.01. The column set was TOSOH Bioscience TSKgel G2500PW×I 7.8 mm ID×30 cm, 7 µm column (P/N 08020) (TOSOH Bioscience USA South San Francisco, Calif.) and a TOSOH Bioscience TSKgel GMPW×I 7.8 mm ID×30 cm, 13 µm (P/N 08025) column. A 20 mM Phosphate buffer in MilliQ HPLC Water, pH ~7.0 was used as the mobile phase. The flow rate was 1.0 ml/minute. A typical injection volume was 20 µL. The system was calibrated using poly(acrylic acid), Na salts Mp 216 to Mp 1,100,000, with Mp 900 to Mp 1,100,000 standards from American Polymer Standards (Mentor, Ohio).

As used herein, the term "31-P NMR" means an analysis of polymer or telomer samples prepared by adding 0.4-0.5 g of an aqueous solution of polymer or telomer analyte at 40-45% solids to 0.5 g of $D_2O$ (Aldrich Chemical Company, St. Louis, Mo.) and mixing, followed by placing the solution polymer in a 17.8 cm (7"), 500 Mz NMR tube and analyzing using a Bruker 500 MHz multi nuclei NMR fully decoupled with 12000 acquisitions having sweep width of 14705 Hz and Pulse Delay of 2 seconds (Bruker, Billerica, Mass.).

As used herein, the term "wt. %" stands for weight percent.

All ranges recited are inclusive and combinable. For example, a disclosed temperature of 175 to 230° C., preferably, 180° C. or more or, preferably, 220° C. or less, would include a temperature of from 175 to 180° C., from 175 to 220° C., from 180 to 220° C., from 180 to 230° C., and from 175 to 230° C.

Unless otherwise indicated, all temperature and pressure units are room temperature and standard pressure.

All phrases comprising parentheses denote either or both of the included parenthetical matter and its absence. For example, the phrase "(meth)acrylate" includes, in the alternative, acrylate and methacrylate.

The present inventors have found that low molecular weight pMAA and its copolymers containing 20 mol % or more of MAA, based on the total moles of monomer used to make the copolymer, show a markedly different thermal stability profile than corresponding high molecular weight pMAA and pMAA copolymers. While low molecular weight pMAA, e.g. having a weight average molecular weight of less than 20,000, and its corresponding copolymers that are made in the absence of hypophosphite are not thermally stable, those (co)polymers made as (co)telomers by polymerization in the presence of hypophosphite or its salts are thermally stable. We have not observed enhanced thermal stability of hypophosphite telomers of AA. Although these telomers readily form anhydride, hypophosphite telomeric anhydrides of AA decomposes upon extensive heating. This thermal difference between telomers of AA and MAA is of particular interest since low molecular weight pMAA and copolymers have important industrial applications. A particular application which is the focus of this application is thermal drying of these to provide a solid polymer product. In the homopolymer of MAA the dry, solid polymers may contain up to 70 mol % anhydride groups.

Hypophosphite (co)telomers of methacrylic anhydride are highly thermally stable. The hypophosphite (co)telomers of methacrylic anhydride form anhydrides at unusually low temperatures, approximately 30° C. lower than poly(methacrylic acid) (pMAA) polymers or their telomers prepared in the absence of hypophosphite. Further, the poly(anhydrides) formed from hypophosphite (co)telomers of methacrylic anhydride are thermally stable over a broad temperature range and do not readily char and decompose as do the corresponding (co)telomers of methacrylic acid prepared in the absence of hypophosphite or its salts. Unlike their poly (acrylic acid) or pAA anhydride analogues, the hypophosphite (co)telomers of methacrylic anhydride of the present invention can be thermally formed without decomposition. In fact, polymers of acrylic acid (AA) and methacrylic acid (MAA) differ substantially in their thermal stability. So, while corresponding poly(acrylic acid) (pAA) forms cyclic anhydrides at about 150° C. and decarboxylate when further heated (approx. 175° C.) leading to thermal degradation and char; the hypophosphite (co)telomers of methacrylic anhydride of the present invention are stable to well over 300° C. Further, upon heating at temperatures above their anhydride formation temperature or dehydration temperature, the hypophosphite (co)telomers of methacrylic anhydride of the present invention are white flakey solids. This is quite unlike mercaptan or persulfate (co) telomers of methacrylic anhydride which are brown and appear charred after such heating. Accordingly, the hypophosphite (co)telomers of methacrylic anhydride of the present invention are particularly attractive precursors for modification to make comb polymers because they can be shipped in dry form and processed rapidly under demanding conditions, e.g. high heat.

In addition, hypophosphite (co)telomers of methacrylic anhydride display reactivity with polyols, amino-polyols both complex and simple primary and secondary alcohols and amines. Such reactivity makes hypophosphite (co)telomers of methacrylic anhydride extremely versatile intermediates for the preparation of a myriad of cement admixture products, polymeric surfactants and detergent builders; such reactivity also makes the hypophosphite (co)telomers of methacrylic anhydride useful as thermoset binders with various crosslinkers and organic extenders, such as dextrose; and as pigment dispersants.

The hypophosphite (co)telomers of methacrylic anhydride of the present invention have on average at least one phosphorus atom in the polymer backbone that is bound to a carbon atom, as determined by 31-P NMR, as a terminal group such as a phosphinate or phosphonate having a vinyl polymer backbone substituent. The at least one phosphorus atom in the polymer backbone can be bound to two carbon atoms, as a phosphite along the carbon chain, such as a diphosphinate having two vinyl polymer backbone substituents. The varied structures of such polymers is described in U.S. Pat. No. 5,294,686.

In accordance with the present invention, hypophosphite (co)telomers of methacrylic anhydride of the present invention can be prepared by hypophosphite chain transfer polymerization of methacrylic acid (MAA) by conventional aqueous solution polymerization methods and then drying to dehydrate them at a temperature of 175° C. or higher, and up to 250° C., preferably, 180° C. or higher, and, preferably, 220°

C. or less. Heating temp is lower at higher temperatures and generally ranges from 5 minutes to 8 hours, preferably, 10 minutes or more, or, preferably, 2 hours or less, more preferably, 15 to 75 minutes. In the case where initial drying is followed by heating, such as spray drying and further heating, the further heating takes place at the above recited temperatures for a period of from 5 minutes or more, or, to 90 minutes, preferably, 70 minutes or less, more preferably, 10 to 60 Minutes.

The hypophosphite (co)telomers of methacrylic anhydride of the present invention can be prepared several known methods. Suitable drying methods may include, for example, extrusion, such as in a single-screw or twin-screw extruder; kneading, such as in a single shaft or twin-shaft kneader reactor, banbury mixer, or a Buss-Kneader Reactor or Single screw reciprocating extruder/mixer; evaporation, such as in a wiped film evaporator or falling film evaporator vessel; heated mixing, such as in a continuous stirred tank reactor (CSTR) or single and twin-rotor mixers, for example, PLOUGHSHARE™ Mixers (Littleford Day Inc., Florence, Ky.), double arm mixers, sigma blade mixer, or vertical high intensity mixer/compounders; spray drying coupled additional higher temperature drying, such as drum dryers or belt dryers.

The hypophosphite (co)telomers of the present invention find many uses, for example, as thermoset powder binders in combination with polyols, polyamines, alkanolamines, polysaccharides or reducing sugars; as pigment dispersants, especially in the form of salts; and as intermediates for making methacrylic anhydride or methacrylic acid comb polymers having one or more alkoxy(poly)oxyalkylene ester or amide side chain, such as, for example, a methoxypolyethyleneglycol ester side chain.

Suitable alkoxy(poly)oxyalkylene functional side chains for the hypophosphite (co)telomers of methacrylic anhydride of the present invention can have from 1 to 500, preferably, 100 or less or 6 or more, or, preferably from 10 to 50 oxyalkylene groups. The alkoxy group of the side chain may have from 1 to 20 carbon atoms. Such esterification and amidation is a conventional process comprising heating and mixing together the hypophosphite (co)telomers of methacrylic anhydride with alkoxy(poly)oxyalkylene glycol or the amine of such a glycol. These alkoxy(poly)oxyalkylene side chain are available from The Dow Chemical Company (Midland, Mich.) under the CARBOWAX™ brand name, and from Clariant as M-Type and B11/D21 Polyglycols (Clariant Corp., Charlotte, N.C.).

Many uses in a wide variety of applications exist for the comb polymers prepared from the hypophosphite (co)telomers of methacrylic anhydride of the present invention. Such comb polymers find use as superplasticizers, especially where the alkoxy group of the side chain has from 1 to 4 carbon atoms. Such comb polymers are particularly useful as builder in detergent compositions, especially liquid detergent compositions, such as disclosed in U.S. Pat. No. 4,797,711 to Swift, et al. In addition, such comb polymers can be used as polymeric dispersants such as pigment dispersants for various coatings applications, suspending agents for suspending particulate materials in fluid media, and the like. In addition, such comb polymers find use as polymeric binders for a variety of coatings applications, such as for architectural coatings, marine coatings, paper coatings, can coatings, binders and coatings for textile and non-woven material, roll coatings, and the like. Further, comb polymers find use as tanning agents for leather manufacture and as rheology modifiers and thickeners, especially where the alkoxy group of the side chain is hydrophobic, having from 8 to 20 carbon atoms.

The following examples illustrate the present invention. Unless otherwise indicated, all parts and percentages are by weight and all temperatures are in ° C.

Synthesis Examples 1, 2, and Comparative Examples 1 A, 3A, 4A, 5A

The Example 1 and 2 hypophosphite telomers of methacrylic anhydride were formed from pMAA polymers that were polymerized in aqueous solution in the presence of sodium hypophosphite in the following proportions:

The precursor poly(methacrylic acid) of Examples 1 and 2 was formed by reacting methacrylic acid in the presence of 8.8 wt. % and 11.0 wt % of sodium hypophosphite, respectively, and in the presence of 3.0 wt. % and 4.0 wt % of sodium persulfate initiator, respectively, all weights based on the total weight of monomer (MAA) charge, in a 3-liter round bottom equipped flask equipped with an with overhead stirring, reflux condenser, nitrogen inlet, thermocouple, graduated addition pump and heating mantel with a Jack-O-Matic™ pot lifter (Glas-Col, LLC Terre Haute, Ind.) at 95° C. with the heating, gradual addition and stirring for a period of 2 hours.

The poly(methacrylic acid) of Example 1 A was formed by reacting methacrylic acid in the presence of 13.0 wt. % of sodium persulfate as initiator (based on total monomer weight) in a vessel as described for the preparation of both Examples 1 and 2 with heating at 95° C. and gradual addition of sodium persulfate for 2 hours followed by a 30 minute hold at 95° C.

The poly(methacrylic acid) of Example 3A was formed by reacting methacrylic acid in the presence of 10.0 wt. % of sodium persulfate as initiator, based on the total weight of monomers, in a reactor and under the reaction conditions described for Examples 1 and 2, above.

The poly(methacrylic acid) of Example 4A was formed by reacting methacrylic acid in the presence of 10 wt. % of sodium persulfate, based on the total weight of MAA, as initiator in the manner described for Examples 1 and 2, above.

The poly(methacrylic acid) of Example 5A was formed by reacting methacrylic acid in the presence of 8.0 wt. % of sodium persulfate (BOM) as initiator, all weights based on the total weight of MAA, in the manner as described for Examples 1 and 2, above.

The inventive hypophosphite (co)telomers of methacrylic anhydride in Examples 1 and 2 and the comparative Example polymers of methacrylic anhydride were prepared by drying as set forth in the tests below for determining peak anhydride conversion temperatures of the telomers and polymers tested for determining the thermal stability of the telomers and polymers tested, and for determining acid to anhydride conversion kinetics.

Examples 1 and 1a

Determining Peak Anhydride Conversion Temperature for Poly-Methacrylic Acid (pMAA) Polymers A TGA Q500 (TA Instruments, New Castle, Del.) thermogravimetric analysis (TGA) device was used for the Example 1 A comparative pMAA homopolymer (Mw 6000, with no hypophosphite) and also for the Example 1 hypophosphite homotelomer of methacrylic anhydride (Mw 6000), with sodium hypophospite (SHP, 8.8 wt. %, based on total weight of monomer). The samples were freeze dried prior to TGA testing. Both samples were heated in $N_2$ and were heated along a heat a ramp from 30° C. to 110° C. at 20° C./minute, followed by a 30 minute hold at 110° C. to further dry the samples. Following the hold, the samples were heated at 20° C./min to 300° C. Anhydride formation is noted by weight loss in the form of water, which is seen as a rise in the derivative weight loss which then drops to a consistent value after anhydride formation and rises only again during degradation of the polymer. Table 1, below shows the derivative weight loss or percent weight loss per minute.

TABLE 1

| Temperature (° C.) | Derivative Weight Loss (%/min) | |
|---|---|---|
|  | Example 1 | Example 1A* |
| 140 | 0.39 | 0.11 |
| 150 | 0.71 | 0.17 |
| 160 | 1.14 | 0.26 |
| 170 | 2.00 | 0.39 |
| 180 | 4.74 | 0.58 |
| 190 | 4.04 | 0.88 |
| 200 | 0.33 | 1.42 |
| 210 | 0.18 | 4.21 |
| 220 | 0.29 | 4.13 |
| 230 | 0.55 | 2.28 |
| 240 | 1.14 | 1.74 |
| 250 | 1.63 | 1.28 |
| 260 | 1.69 | 1.24 |

As shown in Table 1, above, the inventive hypophosphite telomer of methacrylic anhydride of Example 1 forms an anhydride at about 180° C., as shown by weight loss (of water). The peak water loss for the Example 1 hypophosphite telomer is at 184.29° C. with a derivative weight loss value of 5.484%/min. In contrast, the comparative Example 1 A polymer does not form an anhydride until about 210° C. or higher. The peak water loss for the pMAA polymer of comparative Example 1 A is much higher at 214.48° C. and the peak derivative weight loss at this temperature is much lower at 4.914%/min; thus, the rate of anhydride formation in the Example 1 telomer is actually higher at 184° C. than is the rate of anhydride formation of the Example 1A polymer at 214° C. Thus, the hypophosphite incorporated in Example 1 telomer accelerates anhydride formation dramatically, in this case lowering the peak anhydride formation temperature by 30° C. In addition, as heating continues, there is little weight loss for the Example 1 telomer up to 240° C. and it is stable. Meanwhile, the comparative Example 1A polymer loses weight continuously from 200 to 210° C. and up and continually decomposes by further weight loss on heating until it chars. Accordingly, as shown in Table 1, above, the hypophosphite telomer is thermally stable after dehydration; its weight loss is stable up to 240° C. In contrast the comparative Example 1A polymer exhibits mass loss throughout dehydration and appears charred.

Examples

Determining the Thermal Stability of Poly-Methacrylic Acid (pMAA) Polymers and Hypophosphite (Co)Telomers of Methacrylic Anhydride In an aluminum pan were placed approximately 0.5 g of aqueous polymer solution (50 wt % solids), to which was added 2 g of deionized water to provide a thin film. The pan was heated at 150° C. for 60 minutes to fully dry the material; and then the dry material was heated for 30 minutes at 200° C. After heating, the pan was removed from oven and the color of the final product was graded according to the following scale: White-0, Tan-1, Light Brown-2, Brown-3. The following materials and the results of testing in this manner are shown in Table 2, below.

TABLE 2

Color Change of p-MAA Polymers after 30 minutes at 200° C.

| Material | Mw (wt average) | Color |
|---|---|---|
| Example 1 | 6000 | 0 |
| Example 1A* | 6000 | 3 |
| Example 2 | 3500 | 0 |
| Example 3A* | 7500 | 1 |
| Example 4A* | 7500 | 2 |
| Example 5A* | 10000 | 1 |

*Comparative Example

As shown in Table 2, above, both the 3500 Mw and the 6000 Mw hypophosphite telomers of methacrylic anhydride of Examples 1 and 2 are stable at 200° C. In contrast the comparative Example pMAA polymers of comparative Examples 1 A, 3A, 4A and 5A brown, especially the lower molecular weight comparative polymer of comparative Example 1A; this is characteristic of decomposition. Accordingly, the comparative Example poly(methacrylic acid) polymers made without hypophosphite suffer from discoloration. Change in color, especially a darkening, is usually indicative of decomposition in polymers. Thus, especially for the lower molecular weight hypophosphite (co)telomers of methacrylic anhydride, thermal stability is dramatically improved.

Example 4

Determining Anhydride Conversion Kinetics for Hypophosphite Telomers of Methacrylic Anhydride The conversion of a hypophosphite telomer of methacrylic acid to a polymer anhydride can be monitored by fourier transform infrared (FTIR) spectroscopy. Spectra were measured using a ThermoNicolet™ 6700 FTIR (Thermo Fisher Scientific Waltham, Mass.) spectrometer with a variable-temperature Specac Golden Gate™ diamond attenuated total reflectance (ATR) accessory (Specac Inc (USA) Cranston, R.I.). Data collection parameters were 4 cm$^{-1}$ resolution, 16 scans Happ-Genzel apodization and no zero-filling. The ATR accessory was preheated to the desired temperature, and then a film of an aqueous solution of a hypophosphite methacrylic acid telomer at about 6000 daltons was cast onto the ATR crystal. Spectra were continuously measured over time.

FT-IR readily measures acid conversion (1704 cm-1) to anhydride (1756 and 1799 cm-1). The relative amount of carboxylic acid and anhydride is determined by the absorption ratio of the two functional groups. From that data a kinetic profile was determined for Table 3, below.

TABLE 3

Acid to Anhydride Conversion Kinetics (Anhydride peak at 1799 cm$^{-1}$ normalized to sum of anhydride + acid peak at 1703 cm$^{-1}$).

| Sample: Example 1 Telomer | IR Peak Height (Normalized) | |
|---|---|---|
| Time (min) | 180° C. | 200° C. |
| 0 | 0.02 | 0.12 |
| 5 | 0.17 | 0.64 |
| 10 | 0.27 | 0.64 |
| 15 | 0.41 | 0.64 |

TABLE 3-continued

Acid to Anhydride Conversion Kinetics (Anhydride peak at 1799 cm$^{-1}$ normalized to sum of anhydride + acid peak at 1703 cm$^{-1}$).

| Sample: Example 1 Telomer | IR Peak Height (Normalized) | |
| --- | --- | --- |
| Time (min) | 180° C. | 200° C. |
| 20 | 0.50 | 0.64 |
| 25 | 0.53 | 0.64 |

The kinetic profile indicates that anhydride formation is thermally demanding. The maximum peak height is 0.64, indicating that at 200° C., the resulting hypophosphite telomer of methacrylic anhydride has 64% of anhydride groups, based on the total number of acidic groups in the telomere. Temperatures in excess of 180° C. are useful and, preferably, range 200° C. or higher for rapid anhydride formation. Lower temperature can be used, but reaction durations must be extended, such as to about 15-30 minutes at 180° C. for conversion. A temperature ramp to 300° C. at (20° C./min) indicates that anhydride formation commences at about 170° C. for the Example 1 telomer, see Table 1, above.

We claim:

1. A polymer composition comprising a hypophosphite (co)telomer of methacrylic anhydride having a weight average molecular weight ranging from 1,000 to 20,000 and having methacrylic anhydride and methacrylic acid or salt groups, wherein the hypophosphite can be in the form of a salt.

2. The polymer composition as claimed in claim 1, wherein the weight average molecular weight ranges from 2,000 to 15,000.

3. The polymer composition as claimed in claim 1, wherein the hypophosphite (co)telomer of methacrylic anhydride has on average at least one phosphorus atom in the polymer that is bound to a carbon atom of the polymer backbone.

4. The polymer composition as claimed in claim 1, wherein the hypophosphite (co)telomer of methacrylic anhydride has an average of i) from 30 to 80% of polymerized units bearing carboxylic acid or salt groups, based on the total weight of acidic polymerized units and ii) an average of from 20 to 70% of anhydride groups, based on the total weight of acidic polymerized units, all percentages as determined by Fourier transform infrared (FTIR) spectroscopy.

5. The polymer composition as claimed in claim 1, wherein the (co)telomer of methacrylic anhydride comprises from 2 to 20 wt. % of a hypophosphite compound or its salt, based on the total weight of reactants.

6. The polymer composition as claimed in claim 1, wherein the hypophosphite containing (co) telomers of methacrylic anhydride are chosen from hypophosphite containing homotelomers of methacrylic anhydride, and hypophosphite cotelomers of methacrylic anhydride made with additional monomers.

7. The polymer composition as claimed in claim 6, wherein the hypophosphite containing (co) telomers of methacrylic anhydride are made from 20 wt. % to 98 wt. % of methacrylic acid and one or more hypophosphite compounds, based on the total weight of monomers and reactants including the hypophosphite that are used to make the cotelomer.

8. The polymer composition as claimed in claim 1 which is in the form of a powder, pellet, granule, or a suspension in a non-aqueous carrier.

9. A method for making a hypophosphite (co)telomers of methacrylic anhydride comprising drying to form a methacrylic anhydride group in one or more hypophosphite (co) telomer of methacrylic acid at a temperature of 175 to 230° C.

10. The method as claimed in claim 9, wherein the drying takes place in an extruder, kneader or kneader reactor, fluid bed dryer, evaporator, heated mixer and any of foregoing following spray drying.

* * * * *